(12) United States Patent
Kruse et al.

(10) Patent No.: US 9,862,358 B2
(45) Date of Patent: Jan. 9, 2018

(54) WIPER DEVICE FOR APPLYING WASHING WATER

(71) Applicant: Robert Bosch GmbH, Stuttgart (DE)

(72) Inventors: Michael Kruse, Sinzheim (DE); Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/758,560

(22) PCT Filed: Dec. 11, 2013

(86) PCT No.: PCT/EP2013/076164
§ 371 (c)(1),
(2) Date: Jun. 29, 2015

(87) PCT Pub. No.: WO2014/102061
PCT Pub. Date: Jul. 3, 2014

(65) Prior Publication Data
US 2015/0344000 A1 Dec. 3, 2015

(30) Foreign Application Priority Data

Dec. 28, 2012 (DE) .................. 10 2012 224 475
May 8, 2013 (DE) .................. 10 2013 208 576

(51) Int. Cl.
*B60S 1/52* (2006.01)
*B60S 1/40* (2006.01)

(52) U.S. Cl.
CPC ............. *B60S 1/522* (2013.01); *B60S 1/4048* (2013.01); *B60S 2001/4054* (2013.01)

(58) Field of Classification Search
CPC .. B60S 1/52; B60S 1/522; B60S 1/524; B60S 1/482; B60S 1/3862; B60S 1/4048; B60S 2001/4054
USPC .......................................... 15/250.04, 250.02
See application file for complete search history.

(56) References Cited

U.S. PATENT DOCUMENTS

| 3,428,992 | A | * | 2/1969 | Di Giorgio | ............. B60S 1/522 |
| | | | | | 15/250.04 |
| 3,827,101 | A | * | 8/1974 | Wubbe | .................... B60S 1/522 |
| | | | | | 15/250.04 |
| 3,940,068 | A | * | 2/1976 | Mohnach | .................. B05B 1/14 |
| | | | | | 15/250.04 |

(Continued)

FOREIGN PATENT DOCUMENTS

| CN | 102652083 A | 8/2012 |
| CN | 202557496 U | 11/2012 |

(Continued)

OTHER PUBLICATIONS

International Search Report for Application No. PCT/EP2013/076164 dated Mar. 13, 2014 (English Translation, 3 pages).

*Primary Examiner* — Gary Graham
(74) *Attorney, Agent, or Firm* — Michael Best & Friedrich LLP

(57) ABSTRACT

The invention relates to a wiper device, comprising a nozzle unit (10a-10c), which is provided for arrangement on a wiper arm (12a; 12c) and for applying washing water on a vehicle window (14a-14c). It is proposed that the nozzle unit (10a-10c) is designed to apply in one operating state washing water on both sides of a wiper blade (16a-16c) fixed to the wiper arm (12a-12c) on the vehicle window (14a-14c).

8 Claims, 5 Drawing Sheets

(56) References Cited

U.S. PATENT DOCUMENTS

| | | | | |
|---|---|---|---|---|
| 4,922,570 A * | 5/1990 | Hirohama | ............ | B60S 1/3415 |
| | | | | 15/250.02 |
| 5,203,049 A * | 4/1993 | Nogawa | .................. | B60S 1/522 |
| | | | | 137/625.44 |
| 5,433,382 A * | 7/1995 | Baumgarten | ........... | B60S 1/522 |
| | | | | 239/284.1 |
| 5,842,251 A * | 12/1998 | LeFrançois | ........... | B60S 1/3497 |
| | | | | 15/250.04 |
| 5,894,626 A * | 4/1999 | Edele | ...................... | B60S 1/522 |
| | | | | 15/250.04 |
| 6,094,772 A * | 8/2000 | West | ..................... | B60S 1/3415 |
| | | | | 15/250.04 |
| 6,442,788 B1 * | 9/2002 | Fleischer | ................ | B60S 1/522 |
| | | | | 15/250.04 |
| 2008/0127441 A1 * | 6/2008 | Inoue | ..................... | B60S 1/522 |
| | | | | 15/250.04 |

FOREIGN PATENT DOCUMENTS

| | | |
|---|---|---|
| DE | 4415081 | 11/1995 |
| DE | 19914122 | 9/2000 |
| DE | 102004007351 | 9/2005 |
| DE | 102011012533 | 8/2012 |
| JP | 2002302019 A | 10/2002 |
| WO | 2011038913 | 4/2011 |

* cited by examiner

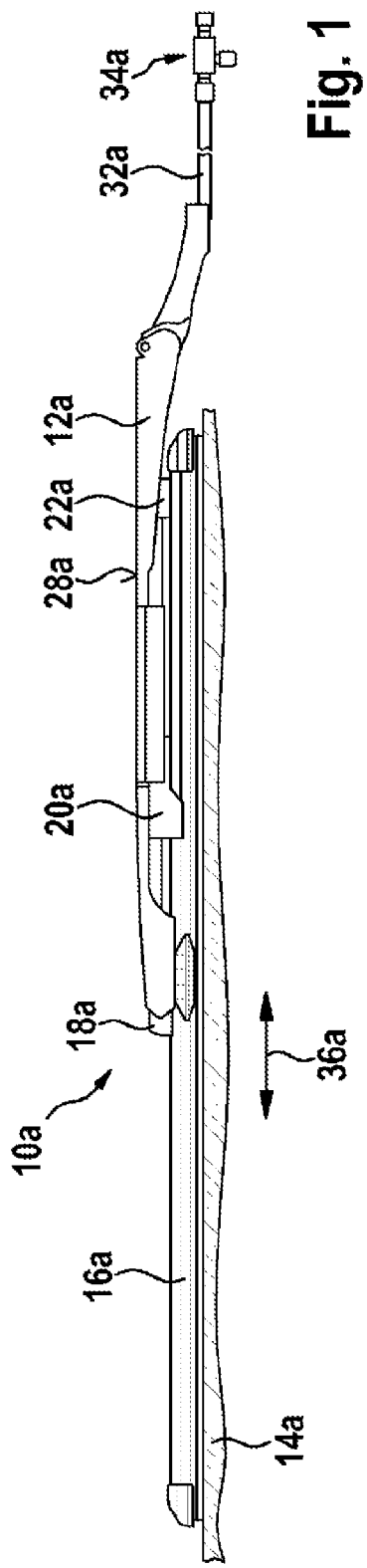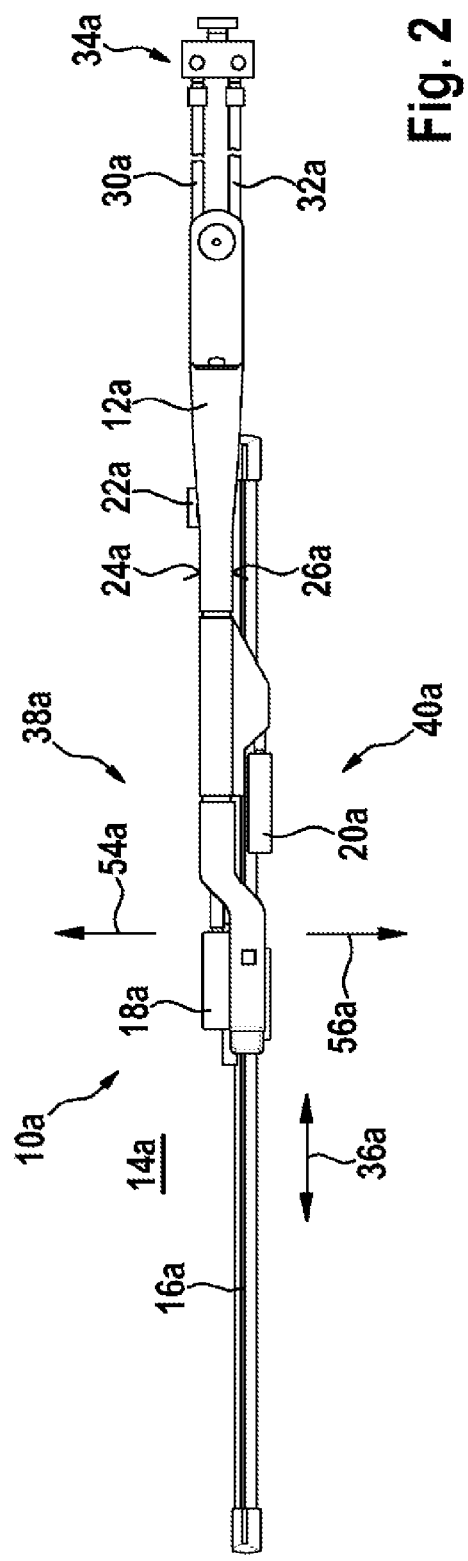

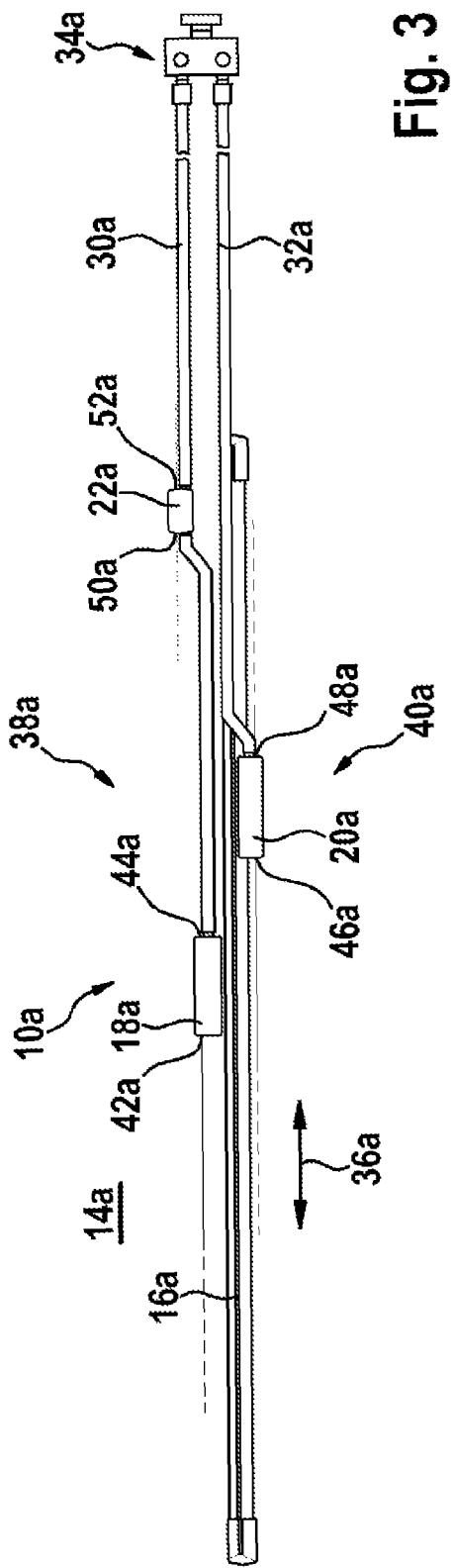

WIPER DEVICE FOR APPLYING WASHING WATER

BACKGROUND OF THE INVENTION

A wiper device having a nozzle unit, which is provided for arrangement on a wiper arm and for applying washing water to a vehicle window has already been proposed.

SUMMARY OF INVENTION

The invention is based on a wiper device having a nozzle unit which is provided for arrangement on a wiper arm and for applying washing water to a vehicle window.

It is proposed that the nozzle unit be provided to apply washing water to the vehicle window in an operating state at both sides of a wiper blade which is secured to the wiper arm, whereby a particularly good wiping result can be achieved with low washing water consumption at the same time. The term "nozzle unit" is intended in this context in particular to be understood to be a unit which comprises at least one nozzle element. Preferably, the nozzle unit comprises at least two nozzle elements. The term "nozzle element" is intended in this context to be understood to be in particular an element which is provided in order to discharge washing water, or to spray it in a specific direction. In particular, the nozzle element has at least one nozzle opening which opens a washing water system with respect to the environment. The nozzle element may be produced from a metal and/or in a particularly advantageous manner from a plastics material. Preferably, the nozzle element is provided to be coupled to a washing water hose. The term "at both sides of a wiper blade" is intended in this context to be understood in particular to be at two sides which adjoin the wiper blade and which face each other or are separated by the wiper blade. In particular, a separation line extends between the two sides along a longitudinal extent of the wiper blade. The term "washing water" is intended in this context to be understood to be in particular a fluid which is suitable for washing and/or cleaning a vehicle window, such as in particular water, alcohols or admixtures which have a water proportion, frost protection proportion and/or alcohol proportion. The term "provided" is intended in particular to be understood to mean specifically configured and/or equipped.

In another embodiment of the invention, it is proposed that the wiper device comprise at least one first washing water hose which is arranged on at least a first nozzle element of the nozzle unit, whereby washing water can be guided in a simple manner to the first nozzle element. The term "washing water hose" is intended in this context to be understood to refer in particular to a tubular element which is provided to direct washing water. Preferably, the washing water hose is constructed in a flexible and/or resilient manner.

Advantageously, the wiper device has at least a second washing water hose which is arranged on at least a second nozzle element of the nozzle unit, whereby washing water can advantageously be guided independently to the one first nozzle element and the at least one second nozzle element.

It is further proposed that the at least one first nozzle element and the at least one second nozzle element be provided to be arranged at opposing wiper arm sides. The term "wiper arm side" is intended in this context to be understood to be in particular a side or apron of a wiper arm which is angled away from a covering side of the wiper arm in an at least substantially orthogonal manner. In particular, the opposing wiper arm sides and the covering side form a substantially U-shaped profile. The term "covering side" in this context is intended to be understood in particular to be a side which at least in an operating state faces away from the vehicle window and/or the wiper blade which is secured to the wiper arm. In particular, the covering side extends at least substantially parallel with the vehicle window and/or with a surface which is intended to be wiped by the wiper blade.

It is further proposed that the at least one first washing water hose be arranged on at least a third nozzle element of the nozzle unit, whereby a particularly uniform water distribution on the vehicle window can advantageously be achieved.

In another embodiment, it is proposed that the wiper device have a washing water distribution unit which is connected to the at least one first washing water hose and the at least one second washing water hose, whereby washing water can advantageously be directed in a simple manner into the at least two washing water hoses. The term "washing water distribution unit" is intended in this context to be understood in particular to be a unit which is provided to distribute or direct washing water into at least two washing water hoses. Preferably, the washing water distribution unit is provided to introduce washing water selectively into the at least two washing water hoses. Preferably, the washing water distribution unit is provided to be arranged on at least one washing water hose in a plug-type connection.

A particularly uniform washing water distribution along a wiper blade can be achieved when the nozzle unit is provided to discharge washing water at least partially substantially parallel with a wiper arm longitudinal direction. The term "at least substantially" is intended in this context to be understood in particular to be with a deviation of less than 20°, preferably of less than 10°, in a particularly preferred manner of less than 5°. The term "wiper arm longitudinal direction" is intended in this context in particular to be a direction which extends parallel with a main longitudinal extent of the wiper arm. The term "main longitudinal extent" is intended in this context to be understood in particular to be an extent which is as large as possible. The term "extent" of an element is intended in this context to be understood to be in particular a maximum spacing between two points of a perpendicular projection of the element on a plane.

The nozzle unit is advantageously further provided to discharge washing water at least partially in a fan-like manner, whereby a particularly large vehicle window surface-area can be wetted with washing water. In this instance, the nozzle unit is provided to discharge washing water at least partially in a fan-like manner relative to the nozzle element, from the wiper arm and/or from the wiper blade. In particular, the nozzle unit is provided to discharge washing water at least partially in a fan-like manner even without a relative movement between the nozzle unit and the vehicle window. The term "fan-like" is intended in this context to be understood to mean in particular in a beam-like manner in different directions. In particular water jets each have an angle of less than 95°, preferably of less than 50°, in a particularly preferred manner of less than 30° with respect to each other.

A particularly rapid assembly of the wiper device can be achieved when the nozzle unit is provided to be at least partially engaged with the wiper arm. The term "engaged" in this context is intended to be understood in particular to mean connected in a locking connection. The term "locking connection" in this context is intended to be understood in particular to mean a connection in which at least one locking element engages in at least one locking recess. The term "locking element" in this context is intended to be understood to mean in particular a resilient element for producing a locking connection which is provided to be resiliently redirected during assembly.

There is further proposed a method for applying washing water to a vehicle window, wherein the washing water is alternately applied by a nozzle unit to two sides of a wiper blade, whereby during a wiping movement, when viewed in a movement direction, washing water can always be applied before the wiper blade.

It is further proposed that, in the event of an upward wiping operation, washing water be applied to the vehicle window precisely at a first side of the wiper blade and, in the event of a downward wiping operation, washing water be applied to the vehicle window precisely at a second side of the wiper blade, which side is arranged opposite the first side, whereby washing water can advantageously be saved with a good wiping result at the same time. Preferably, the washing water in this instance is alternately guided through a first washing water hose and a second washing water hose.

The wiper device according to the invention is not intended in this instance to be limited to the above-described application and embodiment. In particular, the wiper device according to the invention in order to perform a function which is described herein may have a number which differs from a number mentioned herein of individual elements, components and units.

BRIEF DESCRIPTION OF THE DRAWINGS

Other advantages will be appreciated from the following description of the drawings. In the drawings, three embodiments of the invention are illustrated. The drawings, the description and the claims contain numerous features in combination. The person skilled in the art will also advantageously consider the features individually and combine them to form other advantageous combinations.

In the drawings:

FIG. 1 is a side view of a wiper device according to the invention having a wiper arm and a wiper blade, FIG. 2 is a plan view of the wiper device according to FIG. 1 with the wiper arm and the wiper blade, FIG. 3 is a plan view of the wiper device according to FIG. 1 with the wiper blade.

DETAILED DESCRIPTION

Figure 4:
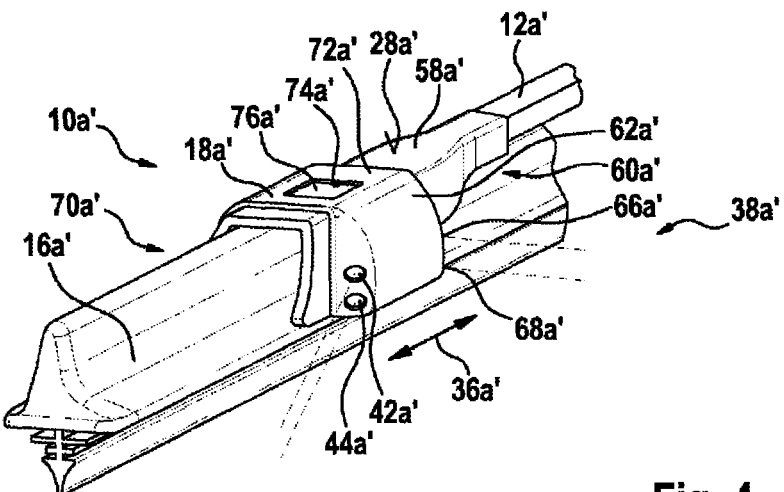
FIG. 4 is a perspective view of an alternative embodiment of a first nozzle element of the wiper device according to FIG. 1.

FIGS. 1 and 2 show an embodiment according to the invention of a wiper device having a wiper arm 12a and a wiper blade 16a in an operating state. The wiper device has a nozzle unit 10a. The nozzle unit 10a in the operating state shown is engaged with the wiper arm 12a and provided to apply washing water to a vehicle window 14a of a motor vehicle which is not shown in greater detail. The wiper blade 16a is provided to wipe the vehicle window 14a.

The nozzle unit 10a applies washing water to a vehicle window 14a at both sides of the wiper blade 16a which is secured to the wiper arm 12a. To this end, the nozzle unit 10a has a first nozzle element 18a, a second nozzle element 20a and a third nozzle element 22a. The first nozzle element 18a and the third nozzle element 22a are arranged at a first wiper arm side 24a of the wiper arm 12a. The second nozzle element 20a is arranged at a second wiper arm side 26a of the wiper arm 12a. The second wiper arm side 26a is arranged opposite the first wiper arm side 24a.

The first nozzle element 18a, the second nozzle element 20a and the third nozzle element 22a are constructed separately from each other. Furthermore, the first nozzle element 18a, the second nozzle element 20a and the third nozzle element 22a are arranged directly on the wiper arm 12a. Furthermore, the first nozzle element 18a, the second nozzle element 20a and the third nozzle element 22a are arranged in a contact-free or touch-free manner with respect to the wiper blade 16a. The first nozzle element 18a, the second nozzle element 20a and the third nozzle element 22a are produced from a plastics material.

The first wiper arm side 24a and the second wiper arm side 26a are connected to each other by means of a covering side 28a of a covering wall 58a of the wiper arm 12a. The wiper arm sides 24a, 26a form with the covering side 28a an angle of 90°, respectively. The opposing wiper arm sides 24a, 26a and the covering side 28a thereby form a substantially U-shaped profile. The first nozzle element 18a is arranged below the covering wall 58a. More specifically, the first nozzle element 18a is arranged at a side of the covering wall 58a opposite the covering side 28a.

In order to supply the nozzle unit 10a with washing water, the wiper device comprises a first washing water hose 30a, which is arranged on or connected to the first nozzle element 18a and the third nozzle element 22a of the nozzle unit 10a. Furthermore, the wiper device has a second washing water hose 32a which is arranged on or connected to the second nozzle element 20a of the nozzle unit 10a. The first washing water hose 30a and the second washing water hose 32a are constructed in a flexible manner.

The wiper device has a washing water distribution unit 34a which is connected to the first washing water hose 30a and the second washing water hose 32a. The first washing water hose 30a and the second washing water hose 32a extend between the wiper arm sides 24a, 26a of the wiper arm 12a from the nozzle unit 10a to the washing water distribution unit 34a. The washing water distribution unit 34a is connected in a manner not illustrated in greater detail to a washing water tank via a washing water pump. The washing water distribution unit 34a directs washing water selectively into the first washing water hose 30a and the second washing water hose 32a. A selection of the washing water hose 30a, 32a which is intended to be supplied with washing water is carried out by means of a regulation and/or control unit which is not shown in greater detail. The first washing water hose 30a and the second washing water hose 32a are each connected to the washing water distribution unit 34a in a plug type connection. The first washing water hose 30a and the second washing water hose 32a are also connected to the nozzle unit 10a in a plug type connection.

FIG. 3 shows the wiper device for reasons of clarity without the wiper arm 12a. The first nozzle element 18a has two nozzle openings 42a, 44a. The nozzle openings 42a, 44a are arranged at opposing sides of the first nozzle element 18a. The second nozzle element 20a also has two nozzle openings 46a, 48a. The nozzle openings 46a, 48a are arranged at opposing sides of the second nozzle element 20a. Furthermore, the third nozzle element 22a has two nozzle openings 50a, 52a. The nozzle openings 50a, 52a are arranged at opposing sides of the third nozzle element 22a.

As a result of the opposing arrangements of the nozzle openings 42a, 44a, 46a, 48a, 50a, 52a, the nozzle unit 10a discharges washing water in two opposing directions parallel with a wiper arm longitudinal direction 36a. The wiper arm longitudinal direction 36a extends parallel with a main longitudinal extent of the wiper arm 12a. The first nozzle element 18a and the third nozzle element 22a in this instance discharge the washing water at a first side 38a of the wiper blade 16a. The second nozzle element 20a discharges the washing water at a second side 40a of the wiper blade 16a. The first side 38a and the second side 40a are separated from each other by the wiper blade 16a in the wiper arm longitudinal direction 36a.

The first nozzle element 18a, the second nozzle element 20a and the third nozzle element 22a are each engaged with the wiper arm 12a in a manner known to the person skilled in the art. It is also conceivable in this context for the first nozzle element 18a, the second nozzle element 20a and/or the third nozzle element 22a to additionally be secured to the wiper arm 12a by means of a materially integral connection, such as, in particular an adhesive connection and/or friction connection.

In order to apply washing water to the vehicle window 14a, the washing water is alternately applied by the nozzle unit 10a to the two sides 38a, 40a of the wiper blade 16a. In an operating state, the wiper arm 12a is pivoted and the wiper blade 16a which is secured thereto is guided over the vehicle window 14a. The nozzle unit 10a which is secured to the wiper arm 12a moves from a starting position in a first movement direction 54a. The nozzle unit 10a in this instance discharges the washing water only from the first nozzle element 18a and the second nozzle element 22a onto the first side 38a. After reaching a turning position, the nozzle unit 10a moves in a second movement direction 56a back to the starting position. The second movement direction 56a is orientated so as to oppose the first movement direction 54a, that is to say, in a state rotated through 180°. The nozzle unit 10a in this instance discharges the washing water only from the second nozzle element 20a onto the second side 40a.

Consequently, in the event of an upward wiping action, washing water is applied to the vehicle window 14a precisely at the first side 38a of the wiper blade 16a and, in the event of a downward wiping action, washing water is applied to the vehicle window 14a precisely at the second side 40a of the wiper blade 16a, which side is arranged opposite the first side 38a. In this instance, the washing water is guided alternately through the first washing water hose 30a and the second washing water hose 32a.

Figure 5:
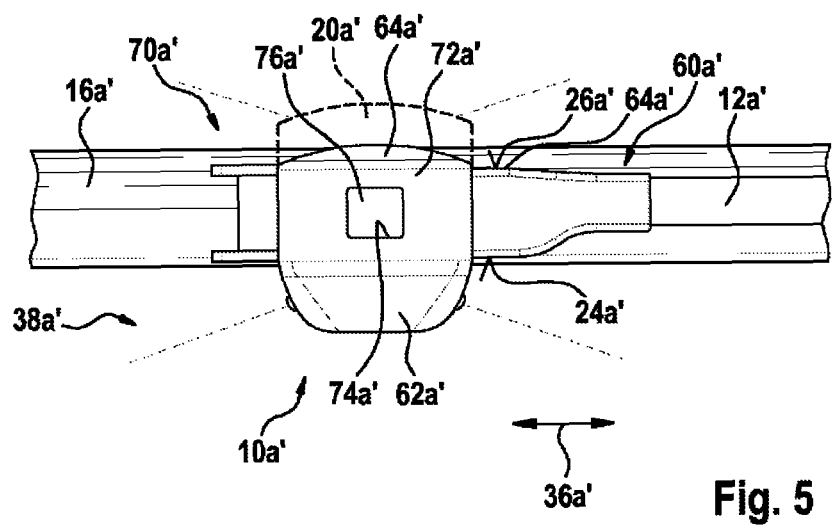
FIG. 5 is a plan view of the first nozzle element according to FIG. 4.
Figure 6:
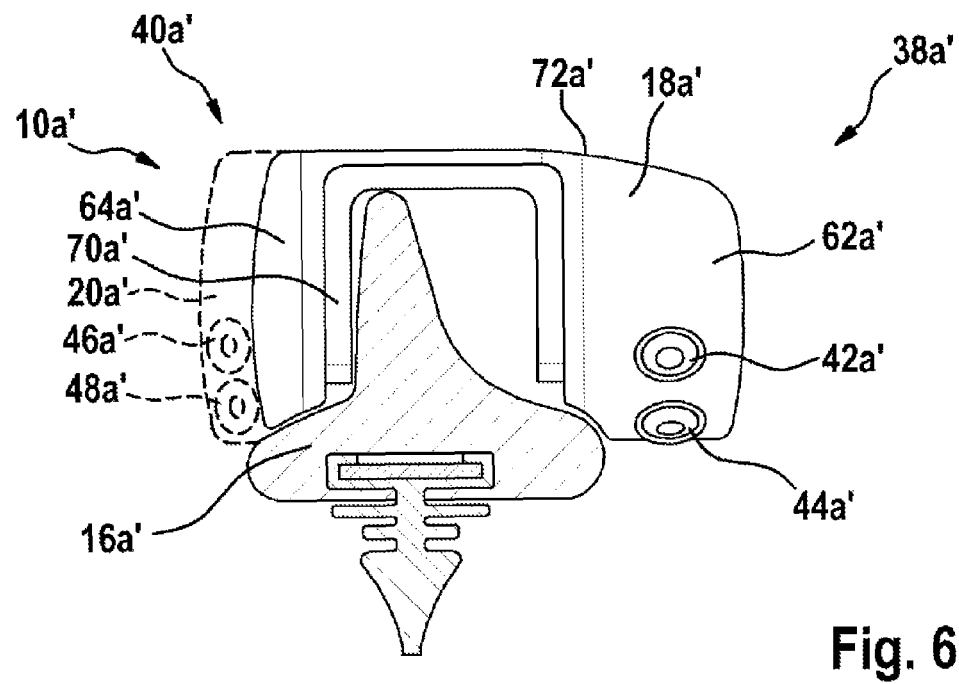
FIG. 6 is a side view of the first nozzle element according to FIG. 4.

FIGS. 4 to 6 show an alternative embodiment of a first nozzle element 18a'. The first nozzle element 18a' shown is arranged on a wiper arm adapter 60a' of the wiper arm 12a'. More specifically the first nozzle element 18a' is engaged with the wiper arm adapter 60a' of the wiper arm 12a'. To this end, the first nozzle element 18a' has at least one locking element which is not illustrated and which corresponds to at least one locking recess which is not illustrated in the wiper arm adapter 60a'. The first nozzle element 18a' terminates flush with a wiper blade adapter 70a' of the wiper blade 16a'. The nozzle element 18a' has in a nozzle covering wall 72a' an assembly opening 74a'. The assembly opening 74a' can be connected to a locking means 76a' of the wiper blade adapter 70a' in a positive-locking manner during assembly. By actuating the locking means 76a', that is to say, by redirecting the locking means 76a' in the direction of the wiper blade 16a', the positive-locking connection can be released. The wiper arm adapter 60a' can then be moved relative to the wiper blade adapter 70a' in a wiper arm longitudinal direction 36a'.

The first nozzle element 18a' is at least partially in abutment with a covering side 28a' of a covering wall 58a' of the wiper arm 12a'. Furthermore, the first nozzle element 18a' has two side aprons 62a', 64a'. The side aprons 62a', 64a' partially engage round the wiper arm adapter 60a laterally. The first nozzle element 18a' has four nozzle openings 42a', 44a', 66a', 68a'. The four nozzle openings 42a', 44a', 66a', 68a' are arranged in a side apron 62a' of the two side aprons 62a', 64a'.

Two of the four nozzle openings 42a', 44a', 66a', 68a', when viewed in the wiper arm longitudinal direction 36a', are arranged at sides of the first nozzle element 18a', facing away from each other, respectively. The wiper arm longitudinal direction 36a' extends parallel with a main longitudinal extent of the wiper arm 12a'. As a result of the opposing arrangements of the nozzle openings 42a', 44a', 66a', 68a', the nozzle unit 10a' discharges washing water in two opposing directions parallel with the wiper arm longitudinal direction 36a'. Consequently, there are produced spray directions in which washing water is discharged from two of the four nozzle openings 42a', 44a', 66a', 68a' which extend parallel with each other, respectively. Alternatively, the spray directions may also form an acute angle relative to each other. The first nozzle element 18a' in this instance discharges the washing water at a first side 38a' of the wiper blade 16a'.

As indicated in FIG. 5, it is in principle also conceivable for a second nozzle element 20a' to be constructed integrally with the first nozzle element 18a'. The first nozzle element 18a' is in this instance arranged at a first wiping arm side 24a' of the wiper arm 12a'. The second nozzle element 20a' is arranged at a second wiper arm side 26a' of the wiper arm 12a'. The second wiper arm side 26'a is arranged opposite the first wiper arm side 24a'. It is further conceivable for the second nozzle element 20a' to have at least two nozzle openings 46a', 48a'.

Figure 7:
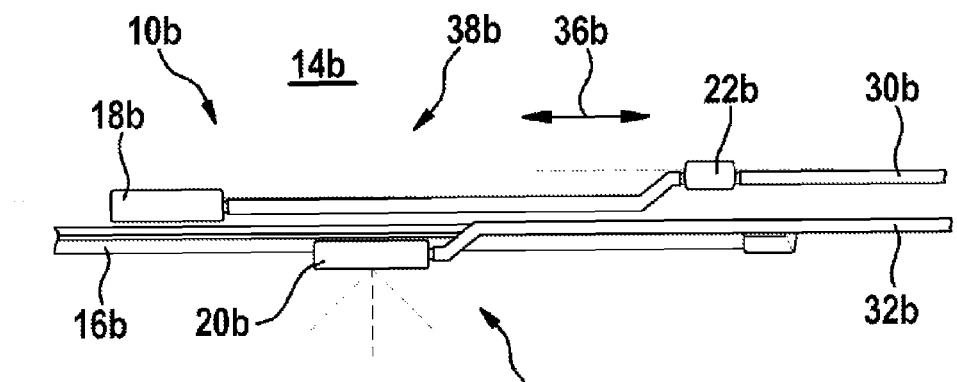
FIG. 7 is a plan view of an alternative embodiment of a wiper device having a wiper blade.
Figure 8:
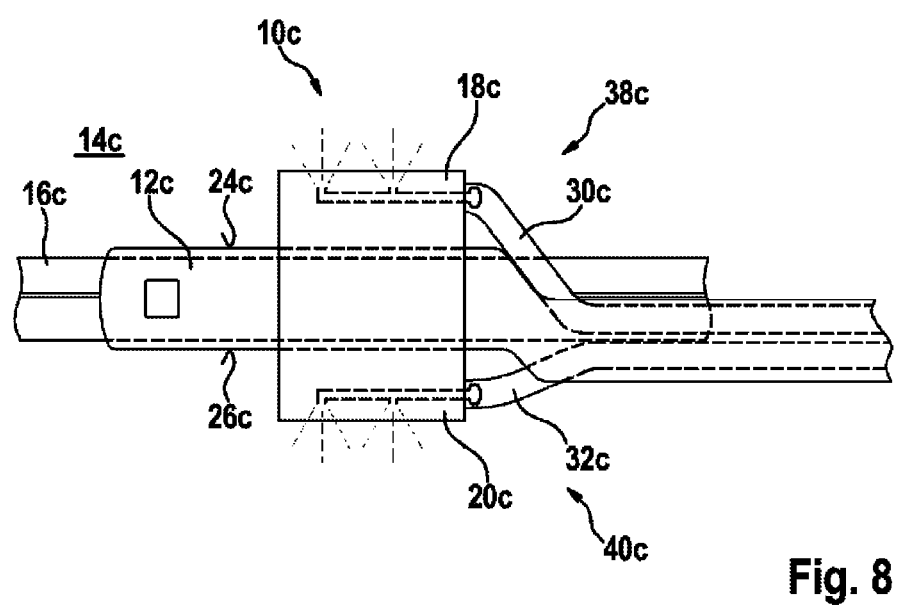
FIG. 8 is a plan view of an alternative embodiment of a wiper device having a wiper arm.

Other embodiments of the invention are shown in FIGS. 7 and 8. The following descriptions and drawings are substantially limited to the differences between the embodiments, reference also being able to be made in principle to the drawings and/or description of the other embodiments, in particular of FIGS. 1 to 6, with regard to components with the same designation, in particular with regard to components with the same reference numerals. In order to differentiate between the embodiments, the letter a is placed after the reference numerals of the embodiment in FIGS. 1 to 6. In the embodiments of FIGS. 7 and 8, the letter a is replaced by the letters b and c.

FIG. 7 shows a wiper device according to the invention having a nozzle unit 10b which is provided for arrangement on a wiper arm which is not illustrated in this instance and for applying washing water to a vehicle window 14b. The nozzle unit 10b applies washing water to the vehicle window 14b at both sides of the wiper blade 16b secured to the wiper arm.

To this end, the nozzle unit 10b has a first nozzle element 18b, a second nozzle element 20b and a third nozzle element 22b. The first nozzle element 18b and the third nozzle element 22b are arranged at a first wiper arm side 24b of the wiper arm. The second nozzle element 20b is arranged at a second wiper arm side 26b of the wiper arm. The second wiper arm side 26b is arranged opposite the first wiper arm side 24b.

In order to supply the nozzle unit 10b with washing water, the wiper device comprises a first washing water hose 30b which is arranged on or connected to the first nozzle element 18b and the third nozzle element 22b of the nozzle unit 10b. Furthermore, the wiper device has a second washing water hose 32b which is arranged on or connected to the second nozzle element 20b of the nozzle unit 10b. The first washing water hose 30b and the second washing water hose 32b are constructed in a flexible manner.

In contrast to the first embodiment, the second nozzle element 20b has nozzle openings 46b, 48b which are arranged at a same side and which have a conical outlet. Consequently, even without a movement of the nozzle unit 10b, a fan-like water jet is produced when washing water is discharged. In other words, the nozzle unit 10b is provided to discharge washing water partially in a fan-like manner onto the vehicle window 14b. The water jet in this instance has a spray angle of 90°. However, it is also conceivable in this context to use another suitable spray angle for applying washing water.

FIG. 8 shows another embodiment of a wiper device according to the invention having a nozzle unit 10c which is provided for arrangement on a wiper arm 12c and for applying washing water to a vehicle window 14c. The nozzle unit 10c applies washing water to the vehicle window 14c at both sides of the wiper blade 16c which is secured to the wiper arm 12c.

To this end, the nozzle unit 10c has a first nozzle element 18c and a second nozzle element 20c. The first nozzle element 18c is arranged at a first wiper arm side 24c of the wiper arm 12c. The second nozzle element 20c is arranged at a second wiper arm side 26c of the wiper arm 12c. The second wiper arm side 26c is arranged opposite the first wiper arm side 24c.

In order to supply the nozzle unit 10c with washing water, the wiper device comprises a first washing water hose 30c which is arranged on or connected to the first nozzle element 18c of the nozzle unit 10c. Furthermore, the wiper device has a second washing water hose 32c which is arranged on or connected to the second nozzle element 20c of the nozzle unit 10c. The first washing water hose 30c and the second washing water hose 32c are constructed in a flexible manner.

In contrast to the first embodiment, the first nozzle element 18c and the second nozzle element 20c are constructed integrally with each other. The first nozzle element 18c and the second nozzle element 20c both apply the washing water to the vehicle window 14c in a fan-like manner.

What is claimed is:

1. A wiper device comprising
   a wiper arm, the wiper arm having a wiper arm adapter (60a'),
   a wiper blade secured to the wiper arm, the wiper blade including a wiper blade adapter (70a'), and
   a nozzle unit (10a-10c) directly engaged with the wiper arm adapter (60a') and directly engaged with the wiper blade adapter (70a'), wherein the nozzle unit (10a-10c) is configured to apply washing water to the vehicle window (14a-14c) in an operating state at both sides of the wiper blade (16a-16c);
   wherein the nozzle unit is releasably engaged with both the wiper arm adapter and the wiper blade adapter, wherein the nozzle unit includes a covering wall (72a') having an assembly opening (74a'), and wherein the wiper blade adapter includes a locking means (76a') engaged with the assembly opening in a positive-locking manner.

2. The wiper device as claimed in claim 1, further comprising at least one first washing water hose (30a-30c) which is arranged on at least a first nozzle element (18a-18c, 22a; 22b) of the nozzle unit (10a-10c).

3. The wiper device as claimed in claim 2, further comprising at least a second washing water hose (32a-32c) which is arranged on at least a second nozzle element (20a-20c) of the nozzle unit (10a-10c).

4. The wiper device as claimed in claim 3, characterized in that the at least one first nozzle element (18a-18c, 22a; 22b) and the at least one second nozzle element (20a-20c) are arranged at opposing sides of the wiper arm (24a-24c, 26a-26c).

5. The wiper device at least as claimed in claim 3, further comprising a washing water distribution unit (34a) which is connected to the at least one first washing water hose (30a) and the at least one second washing water hose (32a).

6. The wiper device at least as claimed in claim 2, characterized in that the at least one first washing water hose (30a; 30b) is arranged on at least a third nozzle element (22a; 22b) of the nozzle unit (10a; 10b).

7. The wiper device as claimed in claim 1, characterized in that the nozzle unit (10a) is configured to discharge washing water at least partially substantially parallel with a longitudinal direction of the wiper arm (36a).

8. The wiper device as claimed in claim 1, characterized in that the nozzle unit (10b; 10c) is configured to discharge washing water at least partially in a fan shape.

* * * * *